United States Patent [19]
Appleman

[11] Patent Number: 6,145,203
[45] Date of Patent: Nov. 14, 2000

[54] MITER CUTTING SHEARS FOR CURVED METAL TRIM

[76] Inventor: Michael P. Appleman, 3813 Clovergate Dr., Colorado Springs, Colo. 80920

[21] Appl. No.: 09/386,624

[22] Filed: Aug. 31, 1999

[51] Int. Cl.[7] .................................................. B26B 13/00
[52] U.S. Cl. .............................................. 30/233; 30/131
[58] Field of Search ............................. 30/233, 286, 289, 30/287, 124, 134, 296.1, 254, 131

[56] References Cited

U.S. PATENT DOCUMENTS

| 853,681 | 5/1907 | Cook et al. | 30/233 |
|---|---|---|---|
| 1,816,056 | 7/1931 | Richard | 30/131 |
| 3,010,206 | 11/1961 | Curry | 30/131 |
| 3,078,503 | 2/1963 | Webb | 30/233 |
| 5,303,475 | 4/1994 | Baker | 30/134 |

FOREIGN PATENT DOCUMENTS

| 464926 | 5/1950 | Canada | 30/233 |
|---|---|---|---|

*Primary Examiner*—Hwel-Slu Payer
*Attorney, Agent, or Firm*—Richard W. Hanes

[57] ABSTRACT

Shears for making angular cuts in curved metal trim, comprising a pair of opposed griping handles, upper and lower pivotally interconnected scissor action shearing jaws having curved cutting edges and attached to the handles for operation thereby, and at least one miter guide attached to one of the shearing jaws and having a straight edge angularly disposed with respect to the plane occupied by the shearing jaws.

10 Claims, 5 Drawing Sheets

MITER CUTTING SHEARS FOR CURVED METAL TRIM

The present invention relates generally to hand tools and more specifically to shears for making angular cuts in curved metal trim.

BACKGROUND

Metal corner trim, comprising a strip of light metal bent at a right angle along its longitudinal center-line, has been used for years to establish rigid, straight edges for wall corners in dry wall construction. More recently, the edge line formed by the intersection of the two bent sides of the beading material has been replaced with a rounded section intermediate the two flat sides that are positioned ninety degrees from one another. The rounded corner edging material has come to be known in the trade as "bullnose." After the surfaces of the flat metal side portions of the bullnose trimming strip are feathered into the dry wall surface with taping mud and texture, a pleasantly rounded corner edge is presented.

When cutting the length of a strip of bullnose that extends from floor to ceiling to size only straight right angle cuts are required. These cuts can be made with conventional sheet metal shears. However, when cutting to length a strip of bullnose that is to be used to edge the corner of a window casing, for example, the end of the strip of bullnose must be mitered in order to fit it properly with the mating end of a similarly mitered piece that is position at right angles to the first piece. Since most angles in a building are right angles the mitered edge is usually cut at 45° to the length of the strip.

The use of traditional sheet metal shears to cut angles on flat material has not presented a significant problem, but as the form of corner trim transitions from flat surfaces with a beaded corner to a curved surface that forms the rounded portion of the bullnose, cutting with ordinary sheet metal shears presents critical problems. First, drawing a satisfactory angular line across a first flat surface, then across the curved metal surface of the bullnose and then across the second flat surface is difficult in the working environment. Second, following the drawn line with sufficient accuracy so as not to create a mitered edge that will not fit snugly with a mating edge is very difficult with conventional sheet metal shears. The predictable result of such an effort is to leave the mitered edge rough, bent and disposed to produce holes between or overlaps with its mating piece, which is also cut with the same impression. Cutting the mitered edge without trying to follow a line renders the same, if not worse, results.

Accordingly, it is the primary object of the present invention to provide a pair of shears for cutting mitered edges on bullnose that will follow a designated angular course across the width of the bullnose in order to execute a well defined mitered edge that is even and straight and will appropriately abut an adjoining piece of angularly disposed and mitered bullnose.

A second object of the invention is to provide a pair of shears for cutting mitered edges on bullnose that does not require a drawn line to follow.

A sill further object of the invention is to provide a pair a bullnose shears that are easy to use and accurate in their execution.

Other and still further objects, features and advantages of the invention will become apparent upon a reading of the following description of a preferred form of the invention, taken in conjunction with drawings that accompany the description.

SUMMARY OF THE INVENTION

The metal shears of the present invention contain a traditional form of griping handles, joints and linkages for shears of this general type, to provide the necessary mechanical advantage for operating the jaws of the tool. While appearing somewhat similar to the jaws of pruning shears, the shape of the jaws of the shears of the present invention are novel in that the curvature of the cutting edges of the jaws conforms to the profile of the desired angular cut across the width of a piece of curved metal trim. Mounted on each side of the shearing jaws is a miter guide. Each miter guide is shaped to conform, in its lateral profile, to at least a portion of the profile of the desired angular cut across the width of a piece of curved metal trim. The miter guide is rigid so as to support the trim strip during the cutting operation. The top plan view of each miter guide resembles an isosceles triangle, where the bases thereof are parallel to the shearing jaws and the vertexes thereof are spaced apart from the sides of the jaws.

DETAILED DESCRIPTION

Figure 3:
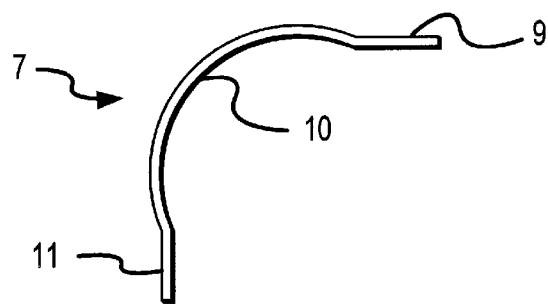
FIG. 3 is an end profile view of a strip of curved metal trim known as "bullnose."
Figure 5:
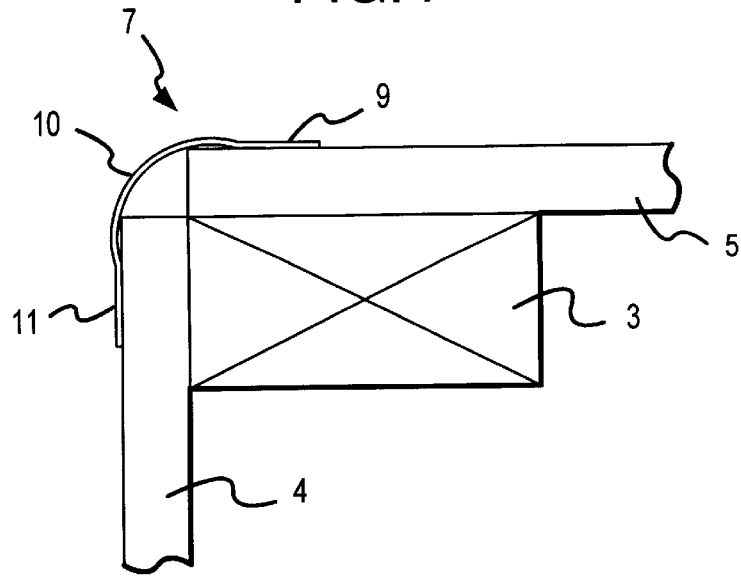
FIG. 5 is a cross sectional view of a dry wall corner covered with the bullnose trim.

Referring first to FIGS. 3 and 5, the nature and use of curved metal trim known as "bullnose" is illustrated. A wall stud 3 supports dry wall sections 4 and 5. A metal trim strip 7 having perpendicularly interrelated sides 9 and 11 and an intermediate curved segment 10 is positioned to cover the open corner between the bare ends of the dry wall sections 4 and 5. An end view of the bullnose trim strip before being anchored to the dry wall sections is shown in FIG. 3.

Figure 4:
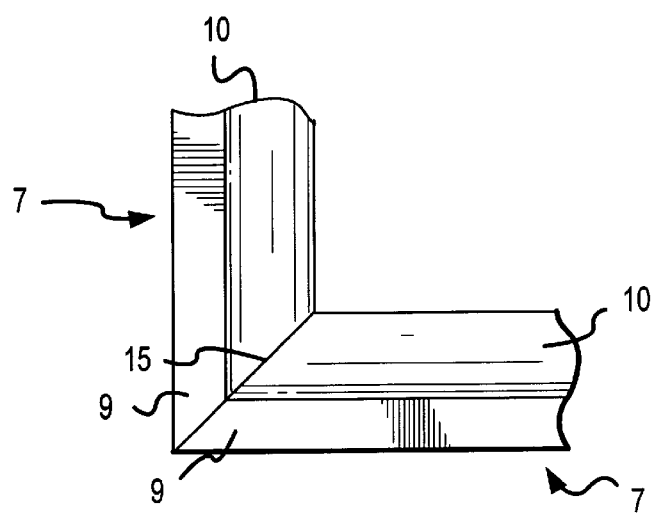
FIG. 4 is a fragmentary top view of two strips of bullnose trim that have been cut with mitered edges to fit together to form a corner.

A typical corner joint of the bullnose trim strip 7 is shown in FIG. 4. To construct such a joint it is necessary to miter the ends of each piece of bullnose trim at a 45° angle in order that they abut together to form a tight right angle corner, similar in configuration to pieces of wooden molding meeting at a corner.

Figure 6:
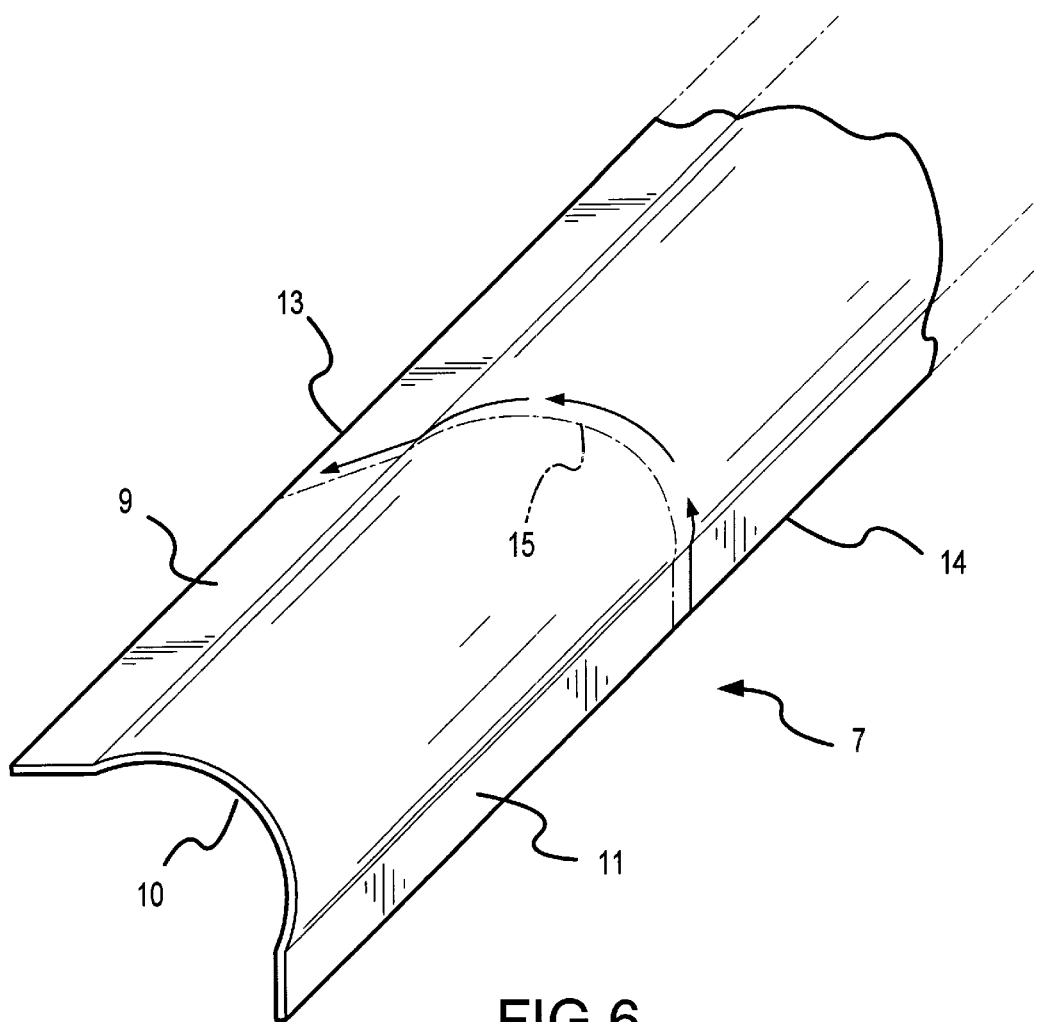
FIG. 6 is a perspective view of a section of bullnose trim showing with arrows and dotted lines the course of a cut that is necessary to miter the edge of the trim strip at a 45° angle.

The course 15 of a 45° angular cut across the width of the bullnose trim strip is shown in FIG. 6. While the angular cut is 45° relative to the second edge 13 of the bullnose trim strip 7, it must begin as a 90° angular cut on the first edge 14 thereof. As the cutting course engages the curved portion 10 of the bullnose trim strip 7 its direction changes to become a 45° angle to the second edge 13.

Figure 1:
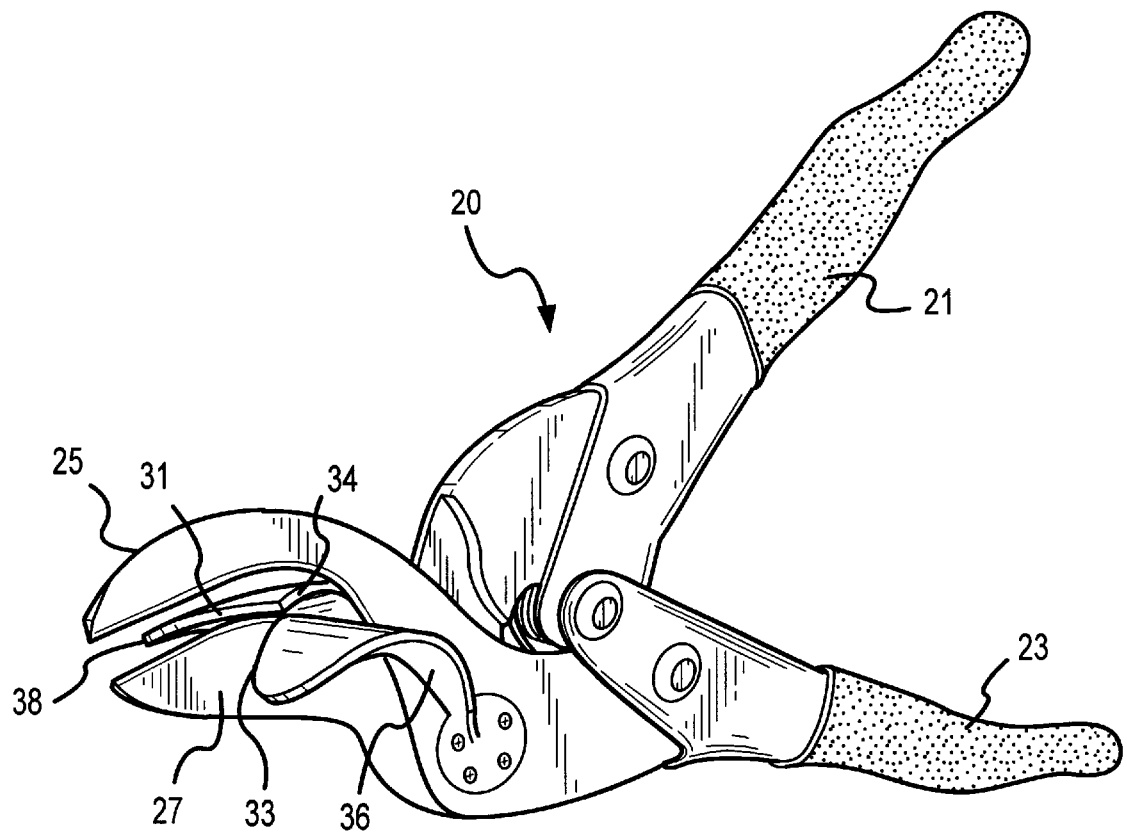
FIG. 1 is a perspective view of the shears of the present invention taken primarily to show the left side.

With the character of a properly mitered cut in the bullnose trim strip in mind, the description will now turn to the shears for making such a cut. Referring first to FIG. 1, the shears 20 of the present invention are shown. Traditional griping handles 21 and 23 are pivotally interconnected to one another and to upper and lower shearing jaws 25 and 27. A short shaft 29 pivotally interconnects the jaws. The handles, pivots and linkages are designed to provide the jaws 25 and 27 with a scissors like cutting action and they may be of any desired construction, there being many to choose from in the prior art.

Figure 8:
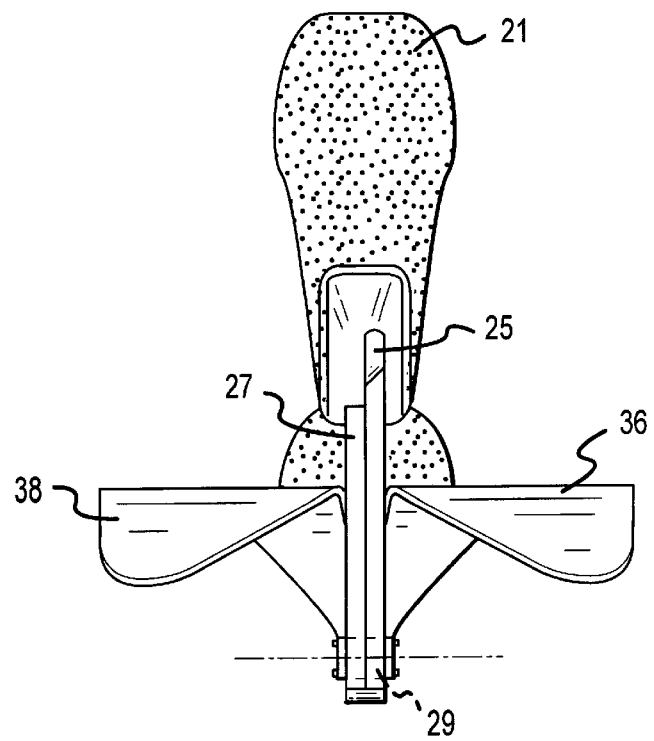
FIG. 8 is a front-end view of the shears of the present invention.
Figure 10:
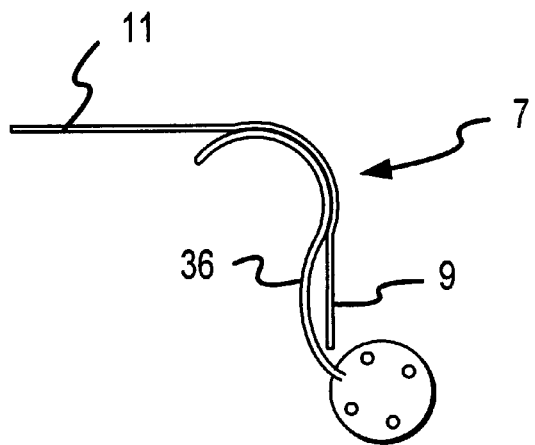
FIG. 10 is a left side view of the left miter guide with a section of bullnose trim strip resting thereon in cutting position. The side view of the miter guide is 45° to the plane of the jaws of the shears.

The novelty of the shears of the present invention lies in the shape of the jaws and in the attached miter guides which enable the user to place the section of bullnose to be cut between the open jaws and aligned therewith at a 45° angle. The angular position of the bullnose section, with respect to the shearing jaws, is maintained by the side 32 or 34 of the miter guides 36 and 38, depending on which guide is employed. The choice of guides is dependent on the angle of the cut to be made, that is whether the cut is to be right or left handed. The miter guides 36 and 38 are secured to the sides of the respective shearing jaws 25 and, as best seen in FIG. 8. Each of the miter guides is shaped to have a lateral profile that conforms to the profile of the bullnose along the cutting course 15, as clearly illustrated in FIG. 10. The sides 31 and 33 of the miter guides are functional only in avoiding interference with the section of the trim strip that extends beyond the cutting jaws. A straight line edge is preferable but any edge that will not interfere with the extended section of the trim strip will suffice. Similarly, the base of the triangularly shaped miter guide is preferably straight, but functionally a straight edge is not required, as long as the miter guide has sufficient body to support the bullnose trim strip in the manner shown in FIG. 10.

Figure 7:
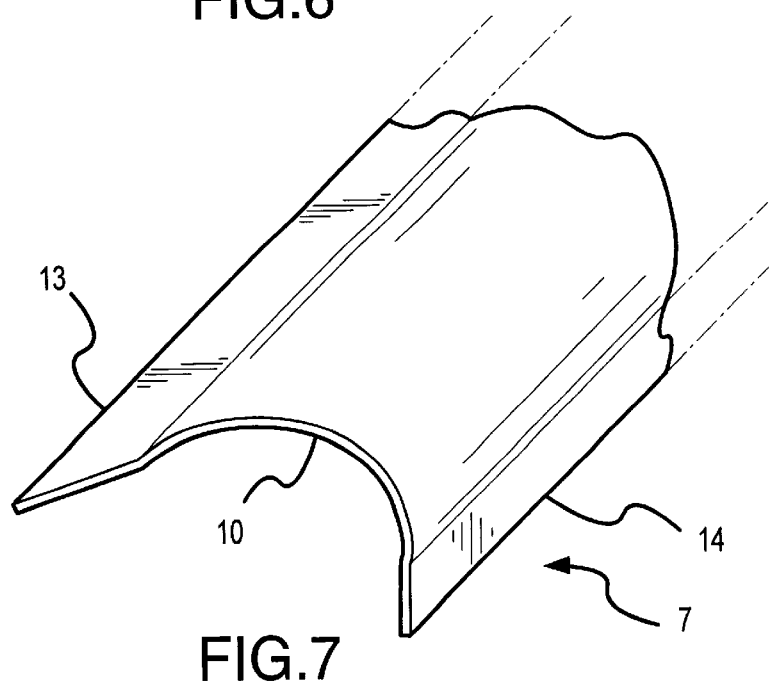
FIG. 7 is a perspective view of a section of bullnose trim strip after being cut at a 45° angle, along the course shown in FIG. 6.
Figure 9:
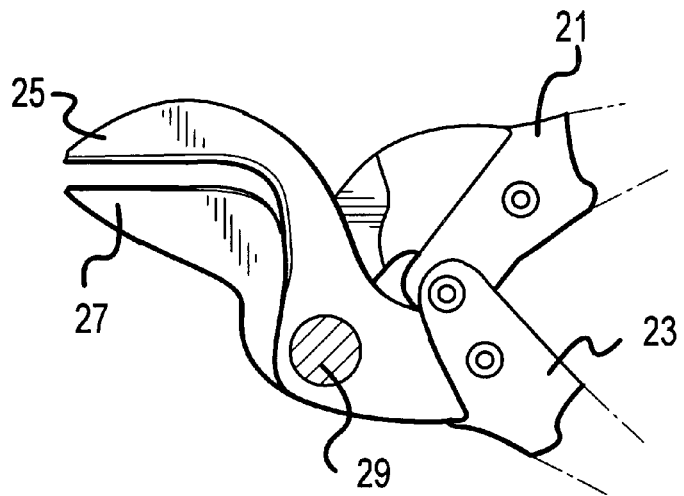
FIG. 9 is a fragmentary cross sectional view of the shears where the cross section is taken along the plane of the left side surface of the jaws. The miter guide on the right side of the shears is not shown for clarity.

The cutting edges of the shearing jaws 25 and 27 are also respectively shaped to substantially conform to the outside and inside profiles of the bullnose trim strip, as that profile is defined along the cutting course 15 (FIG. 7).

Figure 2:
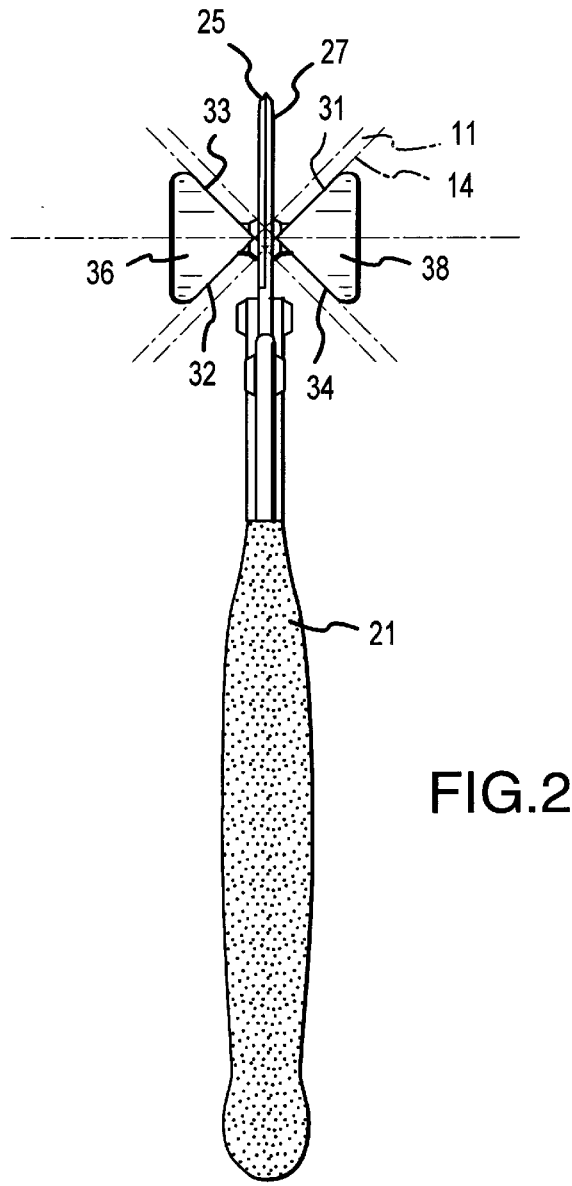
FIG. 2 is a top plan view of the shears with dotted lines showing the location of the edge of the bullnose trim strip as it is positioned for cutting in either of two angular directions.

In operation, the first edge 14 of the bullnose trim strip is inserted into the open jaws of the shears with the strip being retained at a 45° angle to the jaws by the miter guides 36 and 38, depending on which way the cut is to be made. (See FIG. 2 where the edge 14 of the bullnose is shown in dotted lines. When so positioned, the inside surface of the bullnose wraps snugly over the outside contour of one of the miter guides, again depending upon which miter guide is used to retain the trim strip in place during the cutting process. As the jaws 25 and 27 are squeezed together, by operation of the griping handles 21 and 23, the designed curvature of the jaws follows the same profile in the bullnose, creating a smooth single cut along the desired cutting course 15.

I claim:

1. Shears for making angular cuts in curved metal trim, comprising, a pair of opposed griping handles, pivotally interconnected upper and lower scissor action shearing jaws attached to the handles for operation thereby, and two opposed curved surfaced miter guides attached respectively to opposing sides of the shearing jaws, each having at least one straight edge angularly disposed with respect to the plane occupied by the shearing jaws.

2. Shears for making angular cuts in curved metal trim, comprising, a pair of opposed griping handles, pivotally interconnected upper and lower scissor action jaws having shearing edges, and attached to the handles for operation thereby, and at least one miter guide shaped to conform to the curved metal trim, said at least one miter guide being attached to a shearing jaw and having at least one straight edge angularly disposed with respect to the plane occupied by the shearing jaws.

3. The shears of claim 2 where the shearing edges of the upper and lower jaws are shaped to substantially conform to the profile of the curved metal trim, as viewed along the angular cut to be made by the shears.

4. The shears of claim 2 where the side view profile of the miter guide substantially conforms to the inside profile of the metal trim as viewed along the desired angular cut.

5. The shears of claim 4 where the plan view profile of the miter guide contains at least one straight side.

6. The shears of claim 5 where the at least one straight side of the miter guide is at an angle of 45° to the plane occupied by the shearing jaws.

7. The shears of claim 2 wherein the plan view of the miter guide is substantially triangular.

8. The shears of claim 7 where the triangular shape is isosceles and the base of the triangular shape is parallel to the shearing jaws.

9. The shears of claim 8 where the vertex of the triangularly shaped miter guide is spaced apart from the lower jaw.

10. The shears of claim 2 where the at least one miter guide includes two opposed miter guides disposed respectively on opposite sides of the shearing jaws.

* * * * *